United States Patent
Ge et al.

[11] Patent Number: 5,839,812
[45] Date of Patent: Nov. 24, 1998

[54] FLAT PARALLEL LIGHT SOURCE

[75] Inventors: Shichao Ge; Xi Huang, both of San Jose, Calif.; Xiaoqin Ge, Hanzhou, China

[73] Assignee: GL Displays, Inc., Saratoga, Calif.

[21] Appl. No.: 503,588

[22] Filed: Jul. 18, 1995

[51] Int. Cl.[6] ................................................. G01D 11/28
[52] U.S. Cl. ........................... 362/31; 362/328; 362/330; 359/64; 359/65
[58] Field of Search ................................. 362/26, 27, 29, 362/30, 31, 224, 328, 330; 349/62, 63, 64, 65

[56] References Cited

U.S. PATENT DOCUMENTS

| | | | |
|---|---|---|---|
| 5,055,978 | 10/1991 | Rogoff | 362/31 |
| 5,396,406 | 3/1995 | Ketchpel | 362/27 |
| 5,598,281 | 1/1997 | Zimmerman et al. | 349/65 |

FOREIGN PATENT DOCUMENTS

| | | | |
|---|---|---|---|
| 6186433 | 7/1994 | Japan | 362/31 |

*Primary Examiner*—Thomas M. Sember
*Attorney, Agent, or Firm*—Majestic, Parsons, Siebert & Hsue P.C.

[57] ABSTRACT

The present invention relates to a flat parallel light source using the principle of the mirror reflection and diffuse reflection, which comprises a light source, a diffuse reflective chamber with high reflectance walls, a light coupler, a small hole array at the top surface of said diffuse reflective chamber, a mirror reflective cone array on the small hole array, and a convex lens array on said cone array. The light generated by the light pass through the light coupler into the diffuse reflective chamber, and then pass through the small hole array, mirror reflective cone array, and lens array to form parallel light. The flat parallel light source can generate a high intensity parallel light with excellent parallelism or a given scattering angle parallel light. It can be used for backlighting for all kinds of LCDs, and other equipment where parallel light is needed. It can also be used in LCDs to increase the brightness of the display image and reduce power consumption.

17 Claims, 7 Drawing Sheets

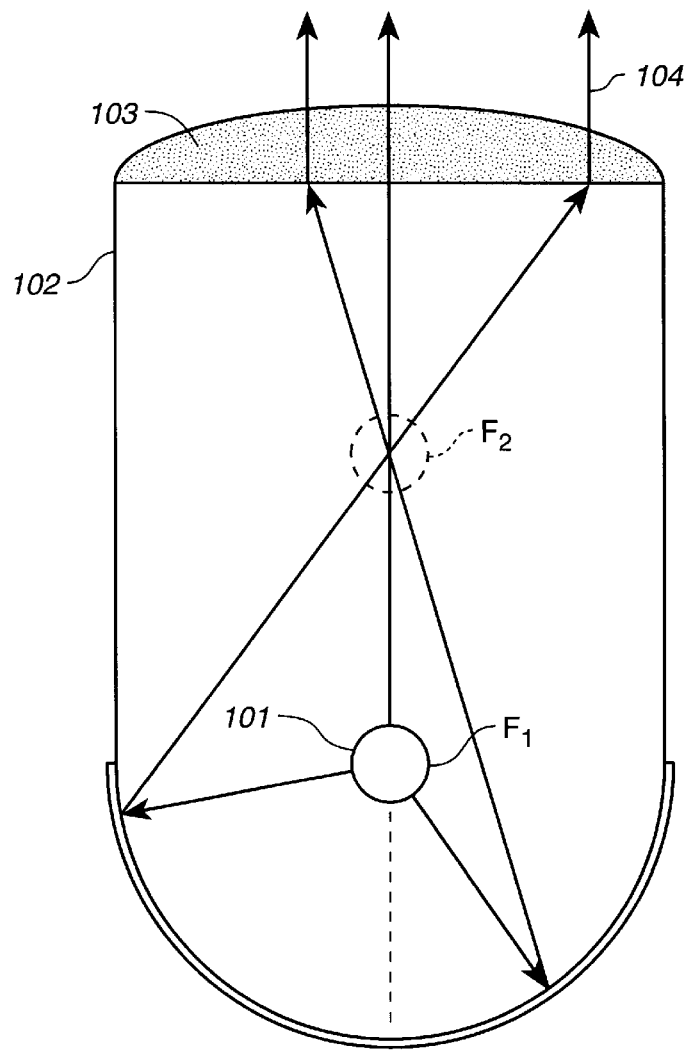
FIG._1
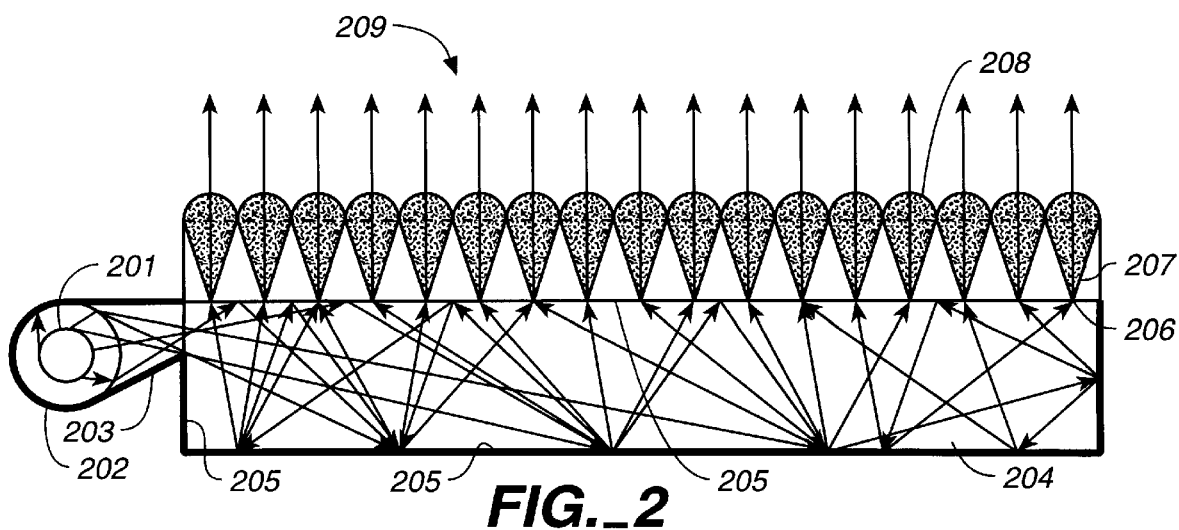
FIG._2

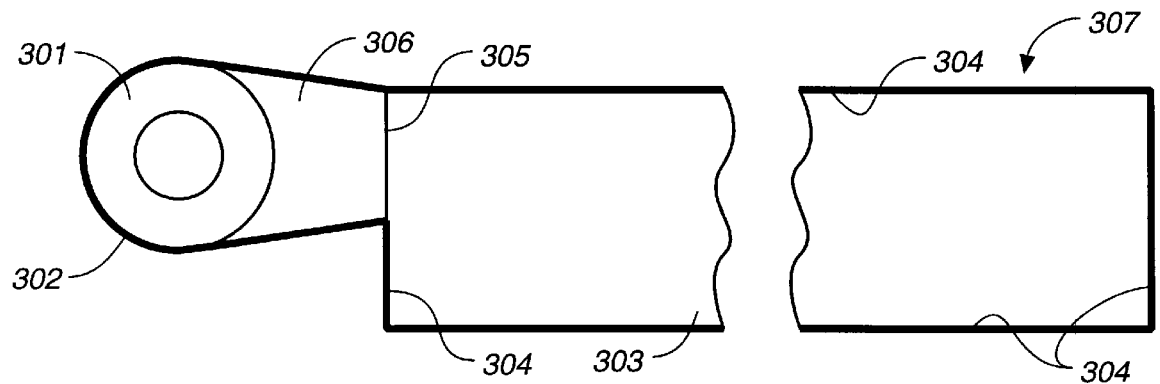
FIG._3
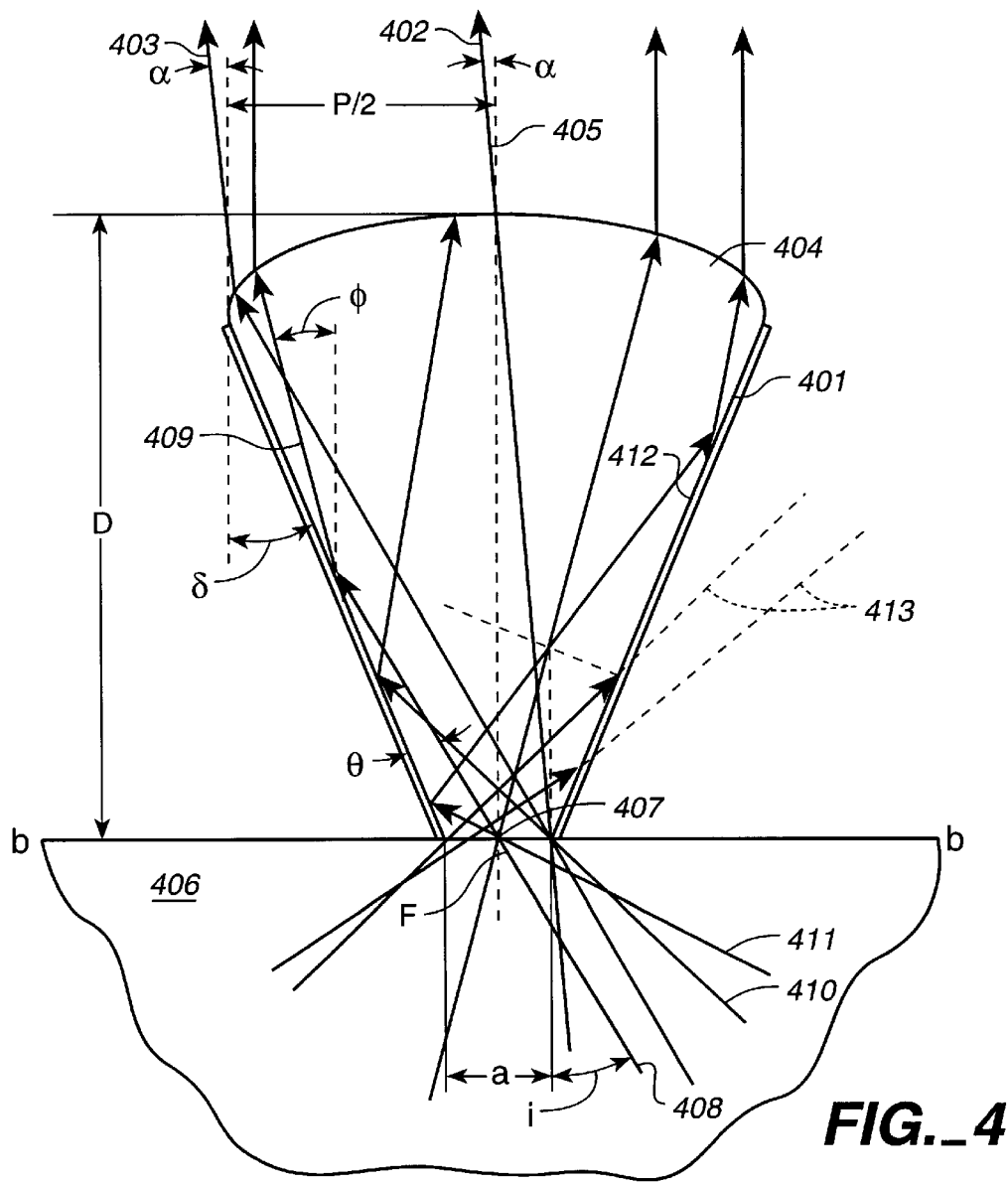
FIG._4

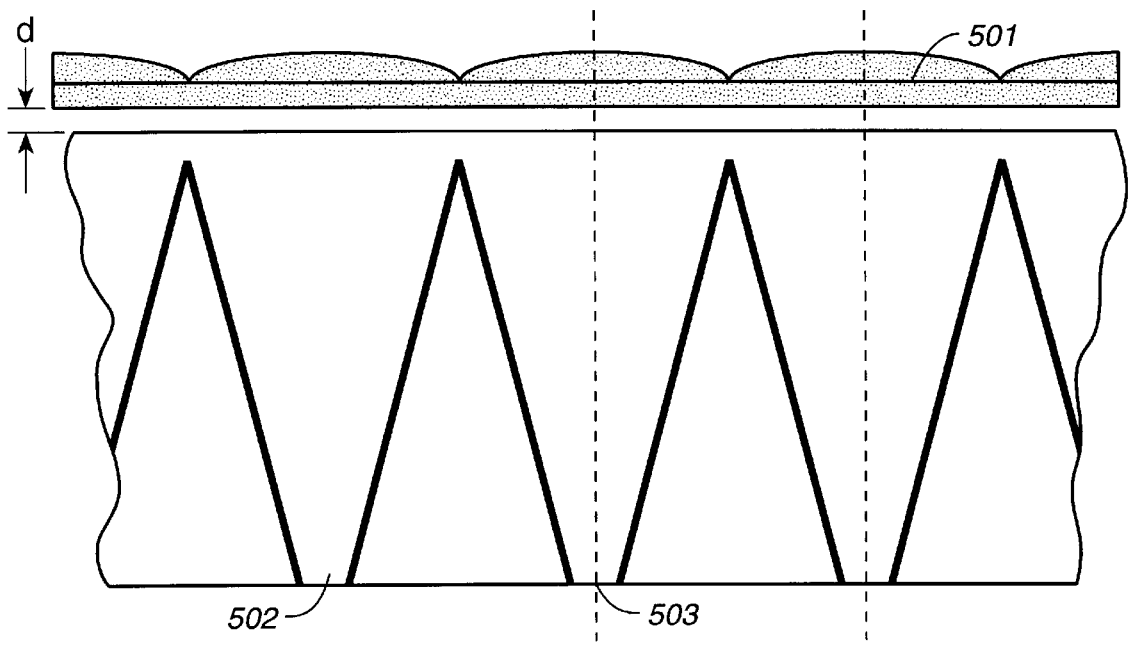
FIG._5
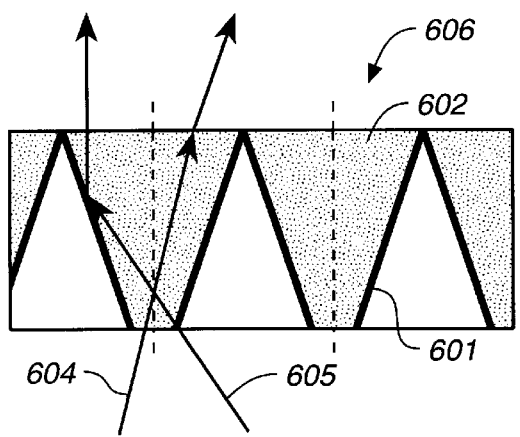
FIG._6a
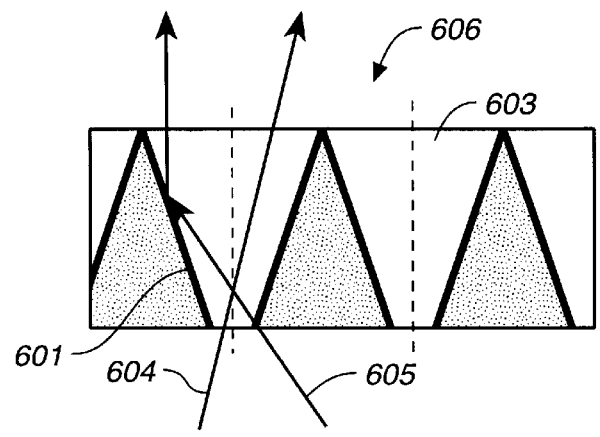
FIG._6b

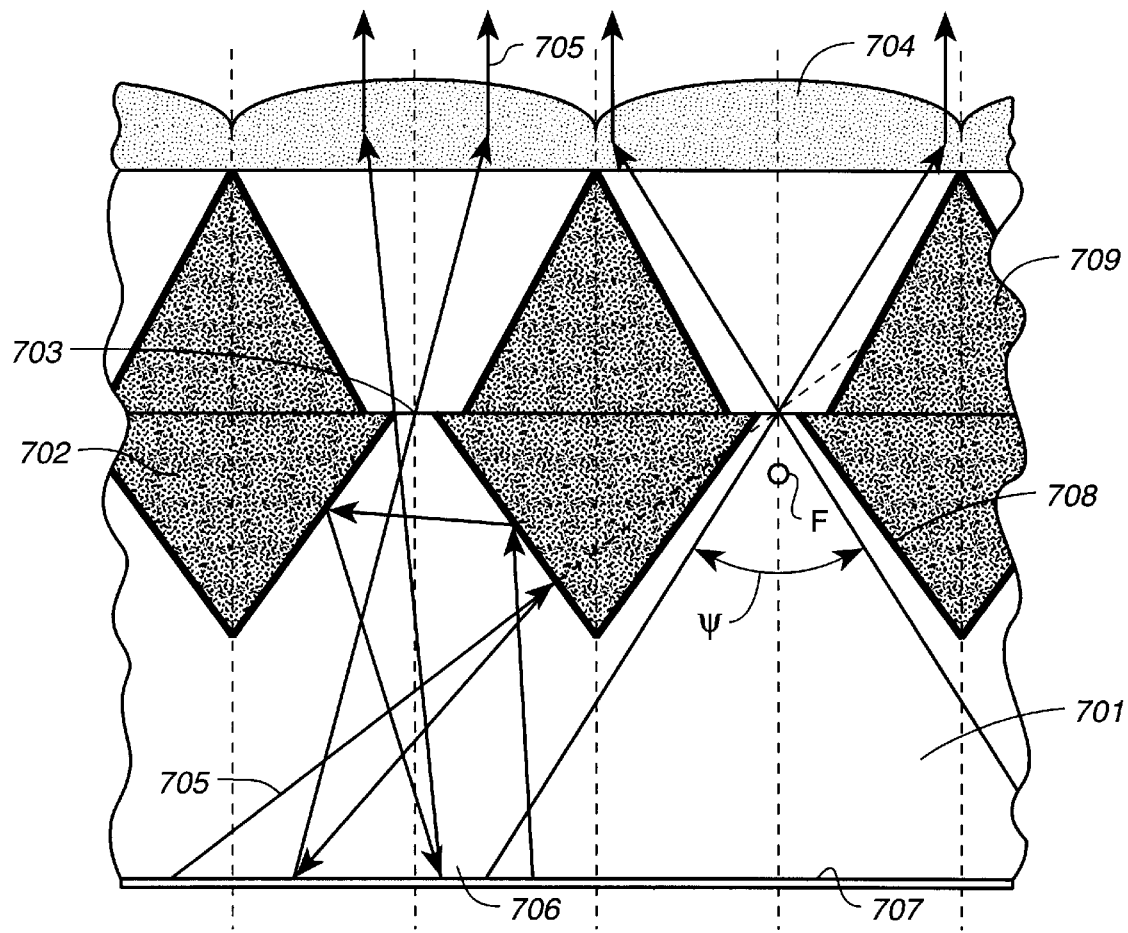
FIG._7
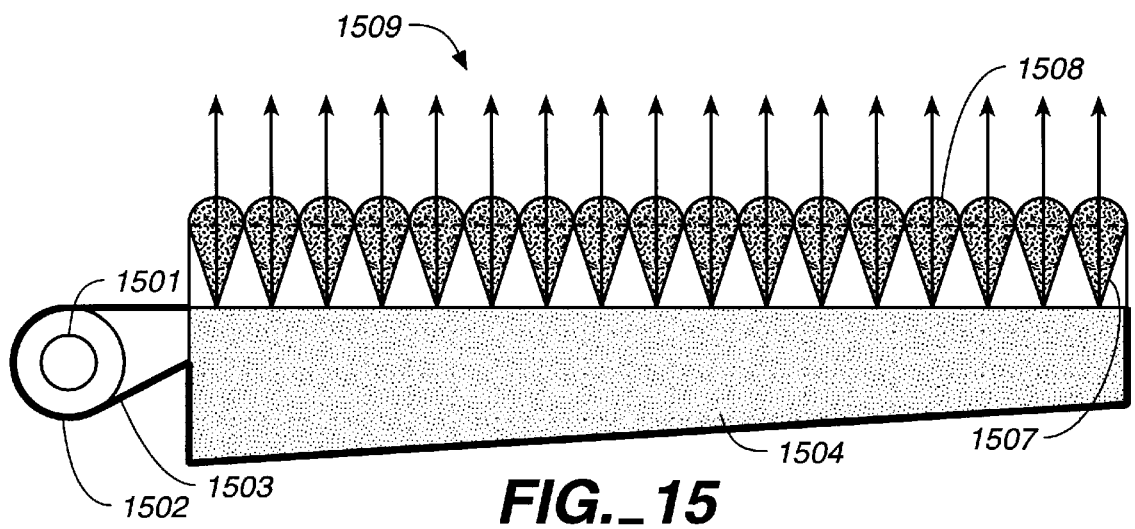
FIG._15

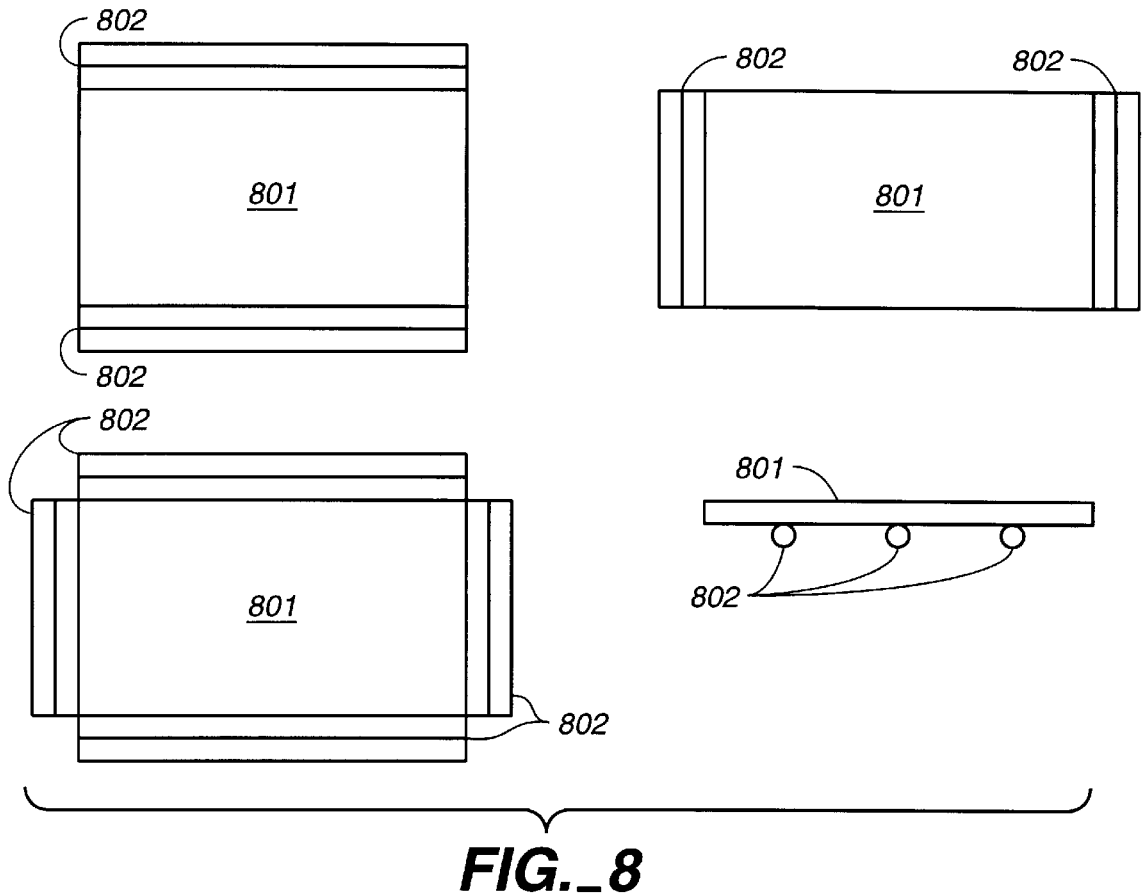
FIG._8
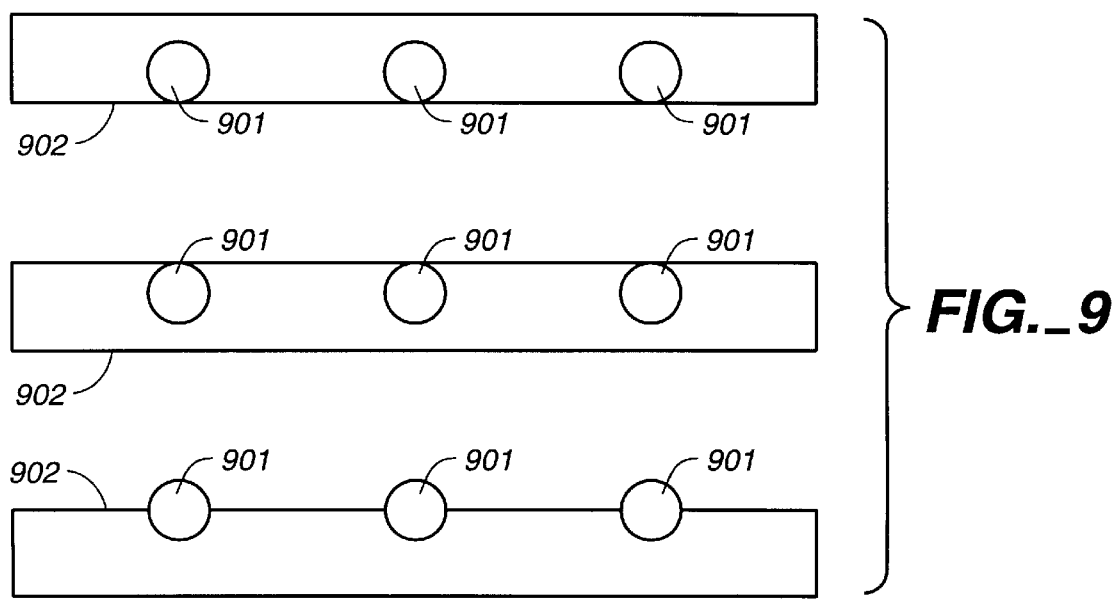
FIG._9

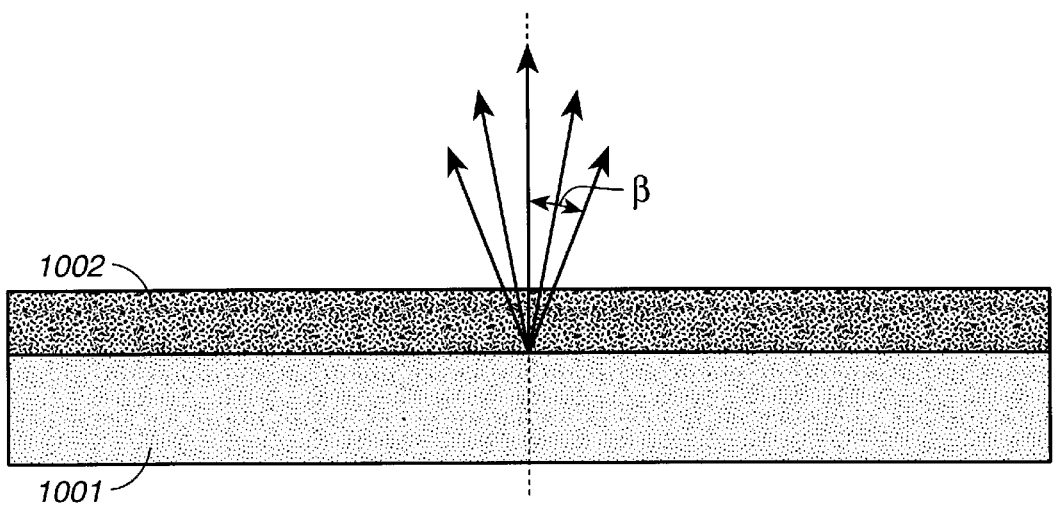
FIG._10
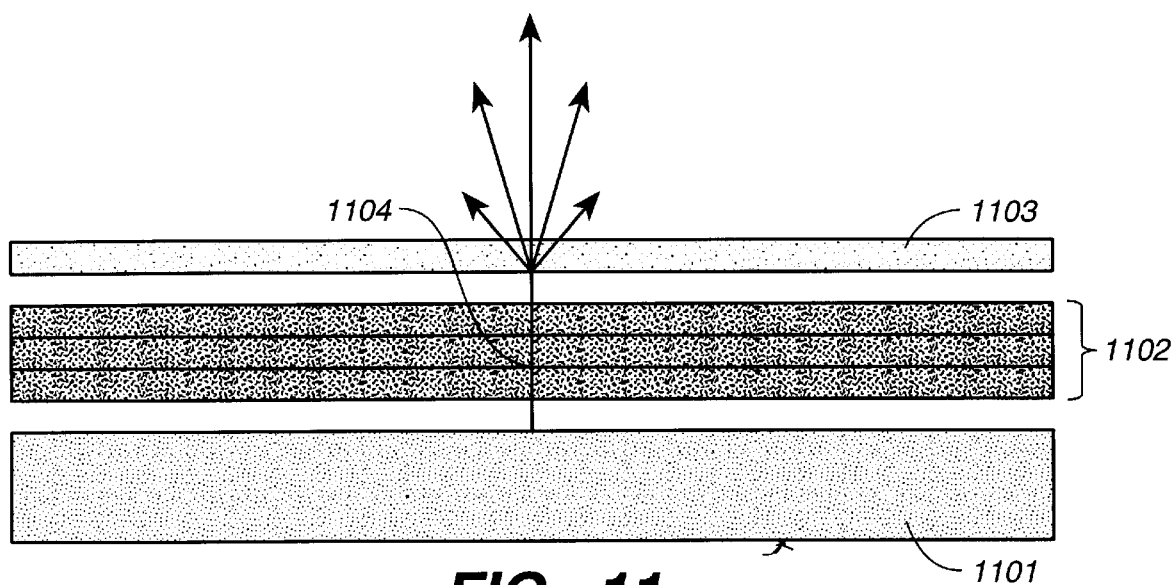
FIG._11
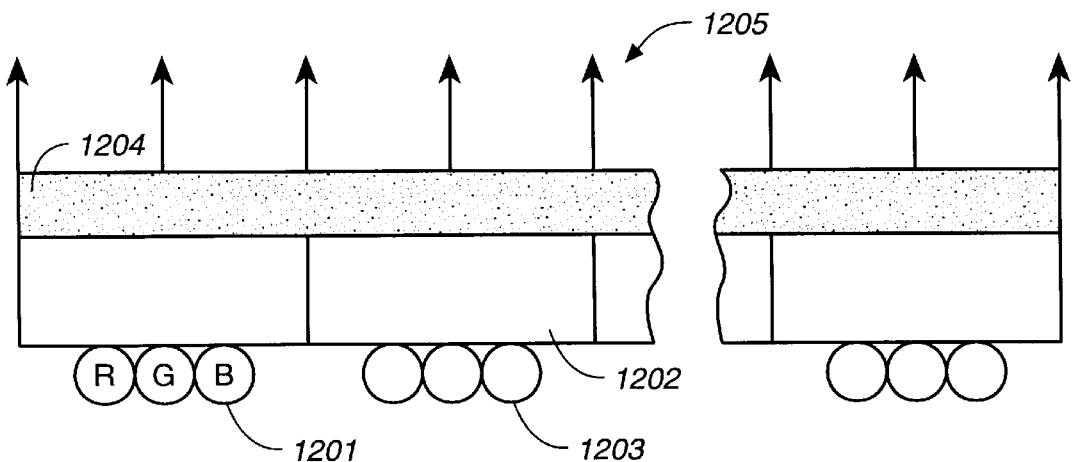
FIG._12

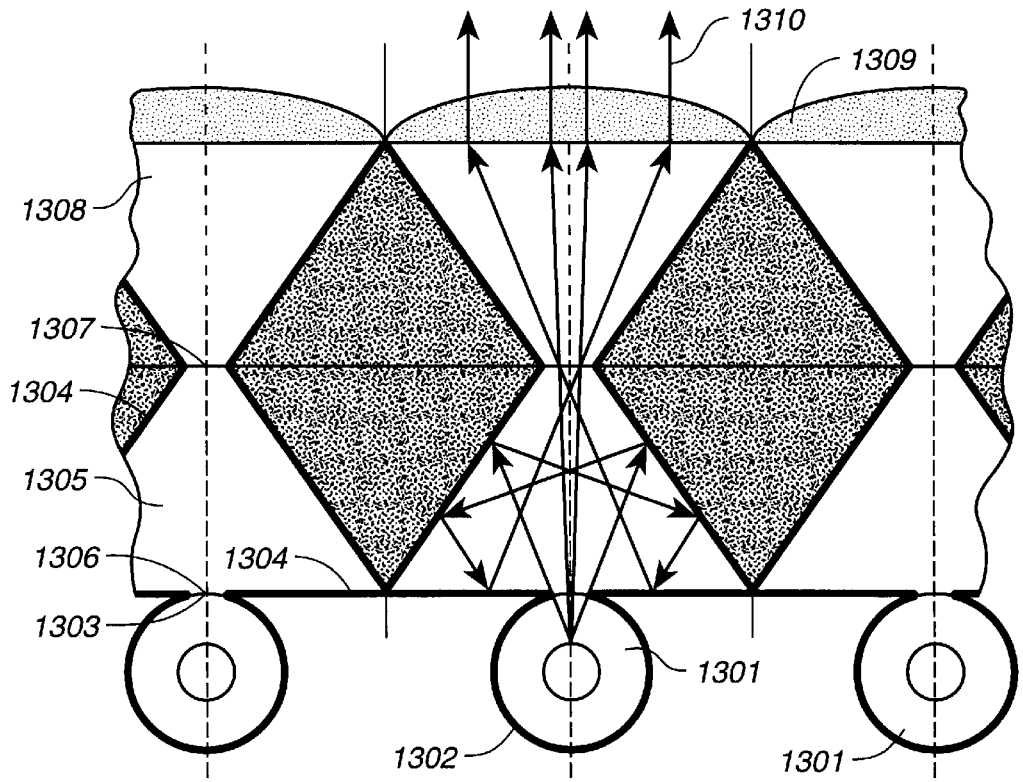
FIG._13
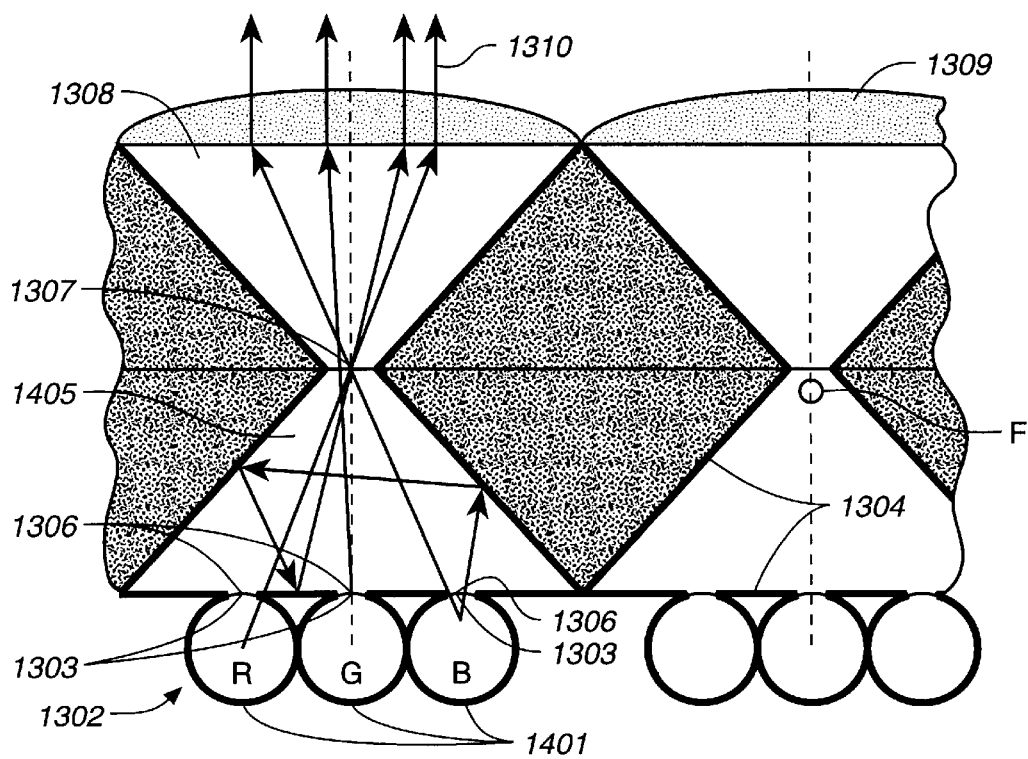
FIG._14

FLAT PARALLEL LIGHT SOURCE

FIELD OF THE INVENTION

The present invention relates to a flat parallel light source. More specifically, it relates to a device capable of producing high efficiency, long lifetime, high brightness parallel light useful as the back light for many types of Liquid Crystal Displays ("LCD") to achieve full color, multicolor or monochrome displays, and for other equipment which may use parallel light as a light source.

BACKGROUND OF THE INVENTION

The point light sources such as the metal-halide lamp, the short arc length xenon lamp, the reflector and lens systems have been conventionally used to generate a parallel light source. These point light sources, although capable of producing good parallel light, usually have a short lifetime and occupy a large space. In addition, these light sources cannot produce any pulse light. Nor can they produce any pulse light comprising three colors, namely, red, blue and green.

It is therefore an object of the present invention to overcome the above-mentioned disadvantage of the point light sources by providing a flat parallel light source which can produce a long lifetime, high efficiency parallel light comprising the white, monochrome or the three colors suitably used as the back light source for the scattering LCD, the active matrix LCD (AM-LCD) or passive matrix LCD to increase screen brightness and to save energy.

It is a further object of the present invention to provide a flat parallel light source suitably used in the stack LCD to produce a multicolor or full color display.

SUMMARY OF THE INVENTION

The present invention relates to a flat parallel light source capable of producing high efficiency, long lifetime, high brightness parallel light. Briefly, a flat parallel light source using the principle of the mirror reflection and diffuse reflection, and comprising a light source, a diffuse reflection chamber, a light coupler and a mirror reflective cone array. The light emitted from the light source is guided by the light coupler, which is located between the light source and the diffuse reflective chamber, into the diffuse reflective chamber. The diffuse reflective chamber further comprises a small hole array located at its top surface from which the light reflected from the diffuse reflective chamber passes through the chamber and enters the mirror reflective cone array. The mirror reflective cone array comprises a plurality of mirror reflective cones which are located on the top surface of the diffuse reflective chamber. Each of the mirror reflective cones has a pointed end and a non-pointed end wherein the pointed end is matched connection to and in direct alignment with the small hole. The non-pointed ends of the mirror reflective cones are connected to the convex lens array which consists of a plurality of convex lenses that are so arranged as to share the same optical axis with the small holes that the small holes are at or near the focal points of the lens. Thus, the light that has passed through the small holes into the mirror reflective cones ultimately pass through the convex lens to form parallel output light.

The light source may comprise at least one cold cathode fluorescent lamp or at least one hot cathode fluorescent lamp. The lamp may contain a reflector or a high reflectance layer such as an Ag, Al or alloy thin film on its outside surface to collect the light emitted from the lamp. The reflectance layer has at least one slit to permit smooth entry of light to the diffuse reflective chamber. The fluorescent lamp may be further enclosed within a glass pipe or tube within which a vacuum chamber is created between the lamp and the glass pipe or tube for the purposes of reducing heat loss from the lamp so as to increase the efficiency of the fluorescent lamp and to decrease the effect of the ambient temperature to the fluorescent lamp.

The light source may be installed from the outside at one side of the diffuse reflective chamber, or at the two sides or four sides or at the bottom or the top of the diffuse reflective chamber. Alternatively, the light source may be installed inside the diffuse reflective chamber and a series of reflective strips or dots are placed on the outside of the light source to ensure that the light emitted from the light source be distributed uniformly in the diffuse reflective chamber.

The diffuse reflective chamber may be a transparent plate or board made of high reflectance walls. The chamber may further comprise a light window existing between the interface of the light coupler and the chamber. The chamber may be a flat panel or in any other shape, preferably, the side of the panel near the light source is thicker, and the other side is thinner, to make the output light from the small holes more uniform. The walls of the diffuse reflective chamber, in the alternative, may be an efficient diffusing wall and made of a rugged surface with high reflectance thin films such as Ag, Al or an alloy thin film. In certain circumstances, the light coupler can be eliminated so that the light source is directly coupled with the diffuse reflective chamber.

The mirror reflective cones may be made of a transparent medium such as plastic, glass, or air consisting of high reflectance walls, and the pointed ends of the cones coupled with the small holes of the diffuse reflective chamber, and the non-pointed ends of the cones coupled with the lens so that the incident light from the small hole can be effectively changed into parallel light through the lens. The mirror reflective cone may be a circular cone, an elliptical cone, a square cone, a rectangular cone, or other shaped cone. In order to eliminate light reflection on the interface between the mirror reflective cone and the diffuse reflective chamber, an optical adhesive is applied between them to achieve this purpose. The reflective cone array and the convex lens array may be made as one piece or made as two separate and independent arrays.

The parallel light source provided by the present invention is also amenable to producing light with different scattering angles. For instance, the location of the small holes can be adjusted away from the focal point of the lens so that the distance between the small hole and the focal point can be manipulated to generate output light having different scattering angles. In addition, the small hole may be made with different sizes ranging from 1% to 90% of the pitch of the small hole in order to obtain output light with different scattering angles. Furthermore, the angle between the mirror reflective wall and the normal line of the diffuse reflective chamber light output surface, may be made with different angles from 1° to 60° to obtain output light with different scattering angles.

The parallel light source can be designed and constructed in a variety of ways to meet specific needs. For instance, it can be conveniently built as one system which comprises at least one diffuse reflective chamber, at least one fluorescent lamp, at least one plurality of small holes, at least one plurality of mirror reflective cones and at least one plurality of convex lenses to generate a very intensive parallel light. Alternatively, one or more of these systems can be further combined or assembled together to generate very high intensive parallel light.

The flat parallel light source provided by the present invention can be best used as the back light for the conventional LCD including, but without limitation to, Active-Matrix LCD or passive LCD to increase the brightness of the LCD image or to decrease power consumption. The flat multi-color or the R, G and B color parallel light source can also be used as the back light for a conventional white/black LCD or a stack LCD to get a multi-color or full-color LCD, and can be used for other equipment where a parallel light source is needed.

The foregoing objects and specific construction of the present invention will become apparent and understandable from the following detailed description thereof, when read in conjunction with the accompanying drawings.

BRIEF DESCRIPTION OF THE DRAWINGS

FIG. 1 illustrates the generation of parallel light by a prior art point light source;

FIG. 2 illustrates a parallel light source provided by the present invention;

FIG. 3 illustrates the arrangements and structure of the light source and diffuse reflective chamber of the present invention;

FIG. 4 illustrates the structure of the mirror reflective cones;

FIG. 5 is a diagram illustrating an alternative for the construction of the mirror reflective cones and the convex lens;

FIGS. 6(a) and (b) illustrate the cross-sectional view of the mirror reflective cones without the lens;

FIG. 7 illustrates another structure of a diffuse reflective chamber, mirror reflective cone and lens;

FIG. 8 illustrates several possible arrangements for the light source provided by the present invention;

FIG. 9 illustrates some alternative arrangements for the light sources;

FIG. 10 is a diagram showing the use of the parallel light source as the back light for a conventional LCD;

FIG. 11 is a diagram showing the use of the parallel light source as the back light for a stack LCD;

FIG. 12 is a diagram showing the use of three colors, red, green and blue to generate parallel color lights;

FIG. 13 is a diagram showing a variant of the parallel light sources; and

FIG. 14 illustrates an alternative way to construct a red, green and blue parallel color light source.

FIG. 15 is a cross-sectional view of a parallel light source to illustrate another embodiment of the invention.

DETAILED DESCRIPTION OF THE INVENTION

Referring to FIG. 1, there is shown a slant view of the prior art device capable of generating parallel light. The reference numeral 101 designates a point light source such as a metal-halide lamp or a short arc length xenon lamp which is located on a first focal point F1 of an ellipse reflector 102. The light produced by the point light source 101 will first be reflected by the reflector 102 and become focused on a second focus point F2, from which the light will pass through a lens 103 to generate parallel light 104. As illustrated in FIG. 1, the prior art device would require a large space if a large area of parallel light is to be generated.

Referring to FIG. 2, there is shown a cross-sectional view of a flat parallel light source device capable of generating parallel light in accordance with the present invention. The reference numeral 201 is a light source which may be a cold cathode fluorescent light ("CCFL") or a hot cathode fluorescent lamp ("HCFL"). The numeral 202 designates a light reflector whose function is to reflect and focus the light produced by the light source 201 into a light coupler 203 through which the focused light will enter a diffuse reflective chamber 204. In an alternative design (although not shown in FIG. 2), the focused light can enter the diffuse reflective chamber 204 directly without the need of a light coupler 203 connected between the light reflector 202 and the diffuse reflective chamber 204. The entire interior surfaces of the diffuse reflective chamber 204 are made up of high reflectance surfaces or walls 205 capable of performing high efficiency reflection. The upper surface of the diffuse reflective chamber 204 has a series of equally spaced small holes 206 through which the reflected light from the diffuse reflective chamber 204 pass out of said chamber. The numeral 207 designates a series of mirror reflective cones whose pointed ends fixedly connect to and align with the small holes 206 of the diffuse reflective chamber 204 to receive the reflected light from the diffuse reflective chamber and on the non-pointed ends has a series of convex lenses 208, being arranged at the same optical axis, and each of the small holes 206 is at or near the focal point of each of the convex lenses 208 which enables the light that passes through the small holes 206 of the diffuse reflective chamber 204, to pass through the convex lenses 208 to form a series of parallel light 209.

In the case that either a cold cathode fluorescent lamp ("CCFL") or a hot cathode fluorescent lamp ("HCFL") is used as the light source 201, it is possible to vacuum pack said lamps from the outside with a glass tube or alike containers to prevent or to reduce heat loss from said lamps. Additionally, the interior or the exterior surfaces of the glass tube or alike containers may be coated with a thin film reflector such as silver or aluminum to enhance the luminous efficiency of the lamps and reduce any adverse impact of ambient temperature on the intensity of the parallel light.

Referring to FIG. 3, the light source 301 with reflector 302 and diffuse reflective chamber 303 are further elaborated. As previously discussed, the interior surfaces of the diffuse reflective chamber 303 are made up of highly reflective surfaces or walls 304 to ensure reflection efficiency. A light input window 305 exists between the light coupler 306 and the diffuse reflective chamber 303 to permit passage of light from the light source to the diffuse reflective chamber 303. Since the combined surface of the light input window 305 and the small holes 307 are much smaller than the total interior surface of the diffuse reflective chamber 303, the light that passed through the light input window may undergo multi-step reflections within the diffuse reflective chamber until finding their ways to pass through the holes 307. Such a design ensures all the light that passed through the small holes 307 possesses the same or substantially the same light intensity.

The diffuse reflective chamber 303 may be made of a transparent board such as glass or transparent plastic or, in the alternative, made of several pieces of highly reflective walls organized or arranged to form a reflective box. The diffuse reflective chamber 303 can be in a variety of shapes. For instance, it can be a square and flat board, or a flat yet non-square chamber made of boards having different thicknesses. A preferred embodiment of the invention is to provide for a diffuse reflective chamber whose reflective walls become thicker at one end to form a curve-like chamber as it gets closer to the light source to ensure the light that passed through the small holes 307 possesses the same or substantially the same intensity. The interior surface of the diffuse reflective chamber may be made of a high reflectance diffuse reflection layer, or rugged surface with Al, Ag or alloy thin film.

Referring now to FIG. 4, the mirror reflective cones 401 (i.e., 207 shown in FIG. 2) are further elaborated. The degree of parallelism of the reflected parallel light 402 is determined by the degree of a scattering angle a which is the angle between the light beam 402 or 403 that passes through the convex lens 404 and the light axis 405, which is perpendicular to the reflection top surface b-b of the diffuse reflective chamber 406. The scattering angle a can be determined by the following equation $$\alpha = \tan^{-1}(a/2D) \tag{1}$$

wherein a is the diameter or size of the small hole 407, and D is the distance between the small hole 407 and the convex lens 404. Thus, when the diameter a is smaller and the distance D is larger, the scattering angle is smaller to yield better parallelism for the light 402 and 403 etc.

The light entering through the small holes 407 may, depending on its entering angle from the diffuse reflective chamber 406 through the small holes 407 to the cones 401, passes through the convex lens 404 directly without further reflection to form parallel light or require further reflections within the cones 401 to form parallel light. For instance, for the purpose of illustration, if the incident angle i is larger than δ, and δ can be calculated by the following equation:

$$\delta = \tan^{-1}[(P-a)/2D] \tag{2}$$

where p is the pitch of the convex lens 404, e.g., the incident light 408 cannot pass through the convex lens 404 directly to form parallel light. Instead it has to be reflected within the cones 401 before passing through the lens as parallel light. The angle φ of the reflection light may be further determined by the following equation:

$$\phi = i - 2\theta \tag{3}$$

wherein φ is the angle between the normal line of b—b and the light 409 after it has been reflected within the cone 401, and θ is the angle formed between the incident light and the reflective wall. Thus, when the incident light reflected each time within the cone 401, its reflected light angle φ will reduce its angle θ by two times. When the value calculated from equation (3) becomes negative, it indicates that the light will be reflected in a direction, which is determined by the normal line of b—b, opposite to that before reflection as so illustrated as light 410.

If the incident light has a relatively larger incident angle i, such as light 411, it may need to go through two or more reflections. Since each reflection angle between the reflected light and the normal line of b—b will reduce two times the angle between the light before reflected and the reflective walls of the cones 404 by two folds, it is essential that all entering light will pass through the convex lens 404 either directly or after being reflected within the cones. This ensures the generation of parallel light sources with extremely high efficiency.

The mirror reflective cones 401 and 206 as shown in FIG. 2 may be built square, rectangular, round elliptical, or in other shapes.

As shown in FIG. 4, each of the lenses 404 is built as an integral part of each of the mirror reflection cones 401 which may be made of any type of transparent materials or medium. Each interior surface of the cones 401 comprises the high reflectance walls 412 which may be coted with a thin film of high reflectance materials such as, but without limitation to, silver, aluminum or alloy. The convex lenses 404 may have a non-spherical surface to ensure that the light passed through is parallel. In addition, the mirror reflective cones 401 and the diffuse reflective chamber 406 may be glued together by certain types of optical adhesive or optical glues to eliminate light reflection on and between each of the interfaces to improve light coupling efficiency if the medium of the cones is not air.

In the present invention, the walls of the mirror reflective cone are the mirror reflective walls, which do not use the principle of the total internal reflection, because in the latter case, when the incident angle between the light and the normal line of the reflection wall of the incident light is less than the critical angle, the light will pass through the cone wall, and cannot be changed into the parallel light shown as 413, and the efficiency of the parallel light source will be decreased.

Furthermore, since the walls of the mirror reflective cone are the mirror walls, the oblique angle δ can be from 1° to 60°. In addition, the medium of the mirror reflective cone also has no limit. For instance, it may be glass, plastic, or air etc.

Referring to FIG. 5, there is shown an alternative way to build the convex lens 501 in connection with the mirror reflective cones 502. The convex lens 501 and the cones 502 may be built as two independent and separate layers of plates. Each of the plates may be molded separately before being assembly mounted together. The lens 501 may be a plano-convex lens or double-convex lens. If the transparent window 503 is located on the focal point of the lens 501, the incident light will pass through the lens to form a good parallel output light. If one desires to change the scattering angle of the output light, the distance d between these two plates can be easily adjusted to achieve this purpose. In order to further simplify the structure, the mirror reflective cones 502 can be entirely eliminated from the device and the light passed through the transparent window 503 can pass through the lens 207 directly to form parallel output light.

FIGS. 6(a) and (b), show still other ways to build the mirror reflective cones 601 without the lens. Wherein FIG. 6(a) is the case of an optical medium cone i.e., there is an optical medium 602, e.g., transparent plastic, in the cones 601. FIG. 6(b) shows the case of an air cone, i.e., there is air 603 in the cones. The incident lights 604, 605 can pass through the cone plate 606 either directly or after being reflected within the cones, to get a wider scattering angle output light.

Referring to FIG. 7, there is shown another way to build the diffuse reflective chamber, reflective cone and the lens that generates parallel light with good parallelism. The reference number 701 is a diffuse reflective chamber. The numeral 702 designates a reflective cone, which is in the diffuse reflective chamber, and the direction is opposite with the mirror reflective cone 206 as shown in FIG. 2, the non-pointed ends of the cone 702 are positioned opposite to the bottom of the diffuse reflective chamber. The numeral 703 designates the pointed ends of the cone, and is also the small hole of the diffuse reflective chamber. The numeral 704 is the lens. The small hole 703 is positioned at or near the focal point of the lens 704, which is arranged at the same optical axis. All the incident light in the solid angle ψ can go through the small hole 703 and lens 704 to become to the parallel light 705. The effect of reflective cone 702 is to reflect the incident light beyond the solid angle ψ, e.g., 705 and 706, to the bottom of the diffuse reflective chamber 701, and then reflect and go through the small hole and lens to become parallel light. The numeral 707 designates the high reflectance walls of diffuse reflective chamber 701 and 708 designates the high reflectance diffuse or mirror reflective walls of the reflective cone 702. The numeral 709 designates a black spacer between lens plate 704 and the diffuse reflective chamber 701, which is used for assembly and absorbing the stray light.

Referring jointly to FIGS. 8 and 9, there are shown the various arrangements of the light source with respect to the diffuse reflective chamber. The light source may be placed on one end outside of the diffuse reflective chamber as shown in FIG. 2, 201. Alternatively, FIG. 8 shows that light source 802 may be placed on both the top and bottom sides or both the left and right ends, or even the entire outside area surrounding the diffuse reflective chamber 801 or placed on the bottom outside of the diffuse reflective chamber 801. FIG. 9 shows the light source 901 placed inside the diffuse reflective chamber 902 in which the light source may be enclosed within a light tube or alike structures on which a plurality of reflective strips or reflective points are evenly or unevenly placed on the surface of the tube to make the light illuminated from the inside placed light source to distribute uniformly within the diffuse reflective chamber.

The parallel light source provided by the present invention may be used in backlighting for a liquid crystal display such as a polymer dispersed LCD (PDLCD) as so described in a pending application, U.S. patent application Ser. No. 08/283,616 now U.S. Pat. No. 5,510,995 filed by the present inventors. In addition, the parallel light source can also be used as the backlighting for an active-matrix LCD (AM-LCD) or a passive-matrix LCD (PM-LCD) as illustrated below.

Referring to FIG. 10, there is shown the use of a parallel light source in AM-LCD or PM-LCD 1002. The parallel light source 1001 may be designed to emit light forming certain scattering angles β in that the output light will focus on and within a certain range of viewing angles to increase the brightness of the backlight and reduce power consumption. This design is particularly desirable in battery-driven LCD equipment, such as a lap-top computer and a pocket LCD TV etc. due to its ability to save battery power consumption. For example, the prior art backlight used in the lap-top computer contains a diffuser whose function is to disperse the output light uniformly to the surrounding environment at an angle equal to $2\pi$ solid angle. However, if the parallel light source of the present invention is used as the backlight, the light can be outputted at a desirable diffusing angle $\Omega$ within which the intensity of the output light will be enhanced by $2\pi/\Omega$ folds; wherein $\Omega$ is the solid angle of the output light which is expressed as $\Omega=2\pi(1-\cos\beta)$. Thus, assuming the scattering angle in the lap-top computer is ±20° and the viewing distance (i.e., the distance between the viewer's eye to the lap-top screen) is 30 cm, and the viewing width is 21 cm, the brightness can be enhanced by $2\pi K/2\pi(1-\cos\beta)=11$ folds, where K is the efficiency ratio of the parallel backlight to the conventional backlight, e.g., K=0.7. In other words, the light source of the present invention is capable of maintaining the same brightness of LCD image as the prior art backlight while consuming only 1/10 of the energy required for the prior art device. For instance, a conventional 10.4" color TFT-LCD may use 3.8 W for its backlight illumination while the same brightness can be achieved by the light source provided by the present invention at only 0.4 W.

Referring to FIG. 11, the use of the parallel light source in stack multi-color or full color LCD is described. The numeral 1101 designates the parallel light source. The numeral 1102 designates a stack LCD which comprises two or three different color LCDs stacked together to achieve multicolor or full color LCD. The numeral 1103 designates a diffuser. Since this type of LCD usually maintains a distance between each of its LCD plates, the light 1104 of backlighting must maintain good parallelism to achieve good overlapping of the images produced by each of the plates to obtain multicolor or full color display. The prior art technology uses M-H light or other point light sources to produce parallel lights which require a larger space to accommodate the light source, needs more energy and has a short lifetime. To the contrary, the light source provided by the present invention has the advantages of high efficiency, energy-saving and long lifetime.

Referring to FIG. 12, the parallel light source can also be used to generate red, blue and green parallel light. The numeral 1201 designates three colors, red, blue and green light sources R, G, B. The numeral 1202 designates the diffuse reflective chamber. The light produced by the light sources 1201 will be reflected by a series of reflectors 1203, which are placed onto the outside surface of the tube enclosing the light source, to enter the diffuse reflective chamber. The light passed through the small hole into plates 1204 containing the mirror reflective cones and convex lens to form parallel light 1205. In order to accommodate LCD scanning, the diffuse reflective chamber can be subdivided into several sections and each of which may have one or more sets of red, blue and green light sources. This design allows sequential production of red, blue and green parallel light to coordinate and accomplish the scanning requirement necessitated by the LCD scanning as so described in pending application, 08/283,616 now U.S. Pat. No. 5,510,915, filed by the same inventors.

Referring to FIG. 13, there is shown a variant of the present invention in which the diffuse reflective chamber is subdivided into a plurality of smaller chambers, each of which has a light source to generate high intensity parallel light. The numeral 1301 designates a fluorescent lamp. The numeral 1302 designates a reflector layer coated on the outside surface of the lamp 1301. The numeral 1303 designates a light coupling window located between a diffuse reflective chamber 1305 and the fluorescent lamp 1301. The numeral 1304 designates the high reflectance diffuse reflective walls. The numeral 1306 designates a light entering window. The light entering window 1306 is tightly matched and mounted together, by a certain optical adhesive, with the light coupling window 1303 to permit entry of the light from the lamp 1301 to the diffuse reflective chamber 1305. The diffuse reflective chamber may be in a cone or other shape and the interior of which is made of highly reflective walls. Each diffuse reflective chamber has a plurality of small holes 1307 between the interface of the chamber 1305 and a cone reflector 1308 to permit entry of light from the diffuse reflective chamber to the cone reflector from where the light can be effectively reflected out of the cone reflector 1308 through a convex lens 1309 to form highly intensive parallel light 1310.

Referring to FIG. 14, there is shown yet another variant of the present invention whose structure is essentially identical with the device shown in FIG. 13 except that the light source 1401 comprising a set of red, green and blue fluorescent lights R, G, and B for each of the diffuse reflective chambers 1405. As described above in FIG. 13, this design can be adjusted to produce high intensity, color parallel light.

FIG. 15 is a cross-sectional view of a parallel light source to illustrate another embodiment of the invention. As shown in FIG. 15, the side of the diffuse reflective chamber 1504 closer to the light source 1501 is thicker and the other side away from the light source is thinner, to make the output light 1509 from lenses 1508 and the cones 1507 more uniform. As before, the light source 1501 is enclosed within a glass pipe or tube 1502 and the light from the source is coupled to the chamber 1504 through a light coupler 1503.

What is the claimed is:

1. A flat device for supplying parallel light, comprising:
a hot cathode fluorescent lamp;
a diffuse reflective chamber with high reflectance walls receiving light from the light source;
an array of holes at a surface of the diffuse reflective chamber;
an array of light reflective cones adjacent to the surface; each of said cones having a pointed end and a non-pointed end; and
an array of convex lenses adjacent the non-pointed ends of the cones;
wherein each of the cones is substantially aligned along a common axis with a corresponding lens in the array of lenses and is between the corresponding lens and a corresponding hole in the array of holes;
wherein light from the light source passes into diffuse reflective chamber, and then through said holes into said cones and through said lenses to provide parallel output light wherein said fluorescent lamp is further enclosed within a glass pipe, said pipe defining a vacuum chamber therein for housing said lamp to reduce heat loss from the fluorescent lamp, to increase the efficiency of the fluorescent lamp and to thermally insulate the fluorescent lamp from an environment.

2. The device of claim 1, further comprising a reflector surrounding the light source to collect and convey the light emitted from the light source into the reflective chamber.

3. The device of claim 2, wherein said reflector comprises a Ag, Al or alloy thin film.

4. A flat device for supplying parallel light, comprising:
a light source;
a diffuse reflective chamber with high reflectance walls receiving light from the light source;
an array of holes at a surface of the diffuse reflective chamber;
an array of light reflective cones adjacent to the surface; each of said cones having a pointed end and a non-pointed end; and
an array of convex lenses adjacent the non-pointed ends of the cones;
wherein each of the cones is substantially aligned along a common axis with a corresponding lens in the array of lenses and is between the corresponding lens and a corresponding hole in the array of holes;
wherein light from the light source passes into diffuse reflective chamber, and then through said holes into said cones and through said lenses to provide parallel output light further comprising high reflectance walls that define therein a diffuse reflective chamber wherein at least one wall is a diffuse reflective wall and wherein said device further comprises a light window connected to the chamber.

5. The device of claim 4, said chamber having four sides, wherein said light source is at one side, two sides or four sides of the reflective chamber.

6. A flat device for supplying parallel light, comprising:
a light source;
a diffuse reflective chamber with high reflectance walls receiving light from the light source;
an array of holes at a surface of the diffuse reflective chamber;
an array of light reflective cones adjacent to the surface; each of said cones having a pointed end and a non-pointed end; and
an array of convex lenses adjacent the non-pointed ends of the cones;
wherein each of the cones is substantially aligned along a common axis with a corresponding lens in the array of lenses and is between the corresponding lens and a corresponding hole in the array of holes;
wherein light from the light source passes into diffuse reflective chamber, and then through said holes into said cones and through said lenses to provide parallel output light, and wherein the diffuse reflective chamber is shaped as a flat panel with two sides, wherein the light source is closer to one side than the other, and wherein the side near the light source is thicker, and the other side is thinner to make the output light from the holes more uniform.

7. The device of claim 6, further comprising walls that define therein the diffuse reflective chamber, said walls including a high reflectance thin film that comprises Ag, Al or an alloy.

8. A flat device for supplying parallel light, comprising:
a light source;
a diffuse reflective chamber with high reflectance walls receiving light from the light source;
an array of holes at a surface of the diffuse reflective chamber;
an array of light reflective cones adjacent to the surface; each of said cones having a pointed end and a non-pointed end; and
an array of convex lenses adjacent the non-pointed ends of the cones;
wherein each of the cones is substantially aligned along a common axis with a corresponding lens in the array of lenses and is between the corresponding lens and a corresponding hole in the array of holes;
wherein light from the light source passes into diffuse reflective chamber, and then through said holes into said cones and through said lenses to Provide parallel output light, wherein said cones have different oblique angles between their walls and a line normal to a surface of the diffuse reflective chamber, said oblique angles having a range from 1° to 60°.

9. The device of claim 8, wherein said cones comprise high reflectance mirror reflective walls, said walls including a thin film composed of Al, Ag or an alloy.

10. The device of claim 8, wherein said cones have circular, elliptical, square or rectangular shapes.

11. The device of claim 8, wherein said reflective cones contain a medium and said diffuse reflective chamber contains a medium that is the same as that in the cones, said medium including transparent plastic, glass or air.

12. The device of claim 8, wherein the reflective cone and the diffuse reflective chamber are attached to reduce light reflection between said reflective cone and said diffuse reflective chamber.

13. The device of claim 8, wherein said convex lenses have non-spherical surface to provide parallel output light.

14. The device of claim 8, wherein said array of cones and said array of lenses are made into and as one piece.

15. The device of claim 8, wherein said array of cones and said array of lenses are separated and independent of one another.

16. A flat device for supplying parallel light, comprising:
   a light source;
   a diffuse reflective chamber with high reflectance walls, receiving light from the light source;
   an array of holes at a surface of the diffuse reflective, chamber;
   an array of light reflective cones adjacent to the surface; each of said cones having a pointed end and a non-pointed end; and
   an array of convex lenses adjacent the non-pointed ends of the cones;
   wherein each of the cones is substantially aligned along a common axis with a corresponding lens in the array of lenses and is between the corresponding lens and a corresponding hole in the array of holes;
   wherein light from the light source passes into diffuse reflective chamber, and then through said holes into said cones and through said lenses to provide parallel output light, wherein the pointed end of each cone is substantially at the focal point of the corresponding lens.

17. A flat parallel light source, comprising a light source;

a lens array;

a diffuse reflective chamber with light reflectance walls;

an array of holes at a surface of the diffuse reflective chamber; and an array of light reflective cones on the surface of the, diffuse reflective chamber, each of said cones having a pointed end, and a non-pointed end, wherein said pointed end of each cone is aligned with a corresponding hole;

wherein light from the light source passes into said diffuse reflective chamber, and then through said holes into said cones and the lens array to provide parallel output light, said device further comprising a reflector collecting light emitted by the light source and light coupler between said light source and said diffuse reflective chamber to guide passage of light from said light source to said diffuse reflective chamber.

* * * * *